US012075894B2

(12) United States Patent
Reagen

(10) Patent No.: US 12,075,894 B2
(45) Date of Patent: Sep. 3, 2024

(54) CRUTCH AUXILIARY CARRYING DEVICE AND KIT

(71) Applicant: Adam J. Reagen, Lake Barrington, IL (US)

(72) Inventor: Adam J. Reagen, Lake Barrington, IL (US)

( * ) Notice: Subject to any disclaimer, the term of this patent is extended or adjusted under 35 U.S.C. 154(b) by 469 days.

(21) Appl. No.: 17/311,222

(22) PCT Filed: Aug. 24, 2020

(86) PCT No.: PCT/US2020/047625

§ 371 (c)(1),
(2) Date: Jun. 4, 2021

(87) PCT Pub. No.: WO2021/041308

PCT Pub. Date: Mar. 4, 2021

(65) Prior Publication Data

US 2021/0346230 A1 Nov. 11, 2021

(51) Int. Cl.

*A45B 1/00* (2006.01)
*A45B 9/00* (2006.01)
*A61H 3/02* (2006.01)

(52) U.S. Cl.

CPC ................ *A45B 1/00* (2013.01); *A61H 3/02* (2013.01); *A45B 2009/002* (2013.01); *A61H 3/0244* (2013.01); *A61H 2201/0103* (2013.01)

(58) Field of Classification Search

None
See application file for complete search history.

(56) References Cited

U.S. PATENT DOCUMENTS 2,893,675 A * 7/1959 Smith .................... F16M 11/10 248/314
2,926,879 A * 3/1960 Dietrich .................. B63B 29/12 224/406
3,090,478 A * 5/1963 Stanley ................... B65B 43/54 248/128

(Continued)

FOREIGN PATENT DOCUMENTS

CN 107139798 A * 9/2017
GB 2163958 3/1986
GB 2473830 3/2011

OTHER PUBLICATIONS

International Preliminary Report on Patentability PCT/US2020/047625—dated Mar. 10, 2022—2 pages.

(Continued)

*Primary Examiner* — David R Dunn
*Assistant Examiner* — Danielle Jackson
(74) *Attorney, Agent, or Firm* — K&L Gates LLP

(57) ABSTRACT

An auxiliary carrying device for crutches comprises: a clip including a base having a surface shaped to conform to a crutch rail, (i) an aperture through the base for receiving a connector to connect to the crutch via a hole in the rail of the crutch or (ii) a stud extending from the base for insertion through the hole in the rail of the crutch, and two arms extending outward from the base, the arms configured to secure a holder; and wherein the holder includes a bottom, at least one side and an interior cavity, the holder including an inflatable body such that the at least one side is compressible and expandable to conform to objects inserted into the interior cavity.

28 Claims, 6 Drawing Sheets

(56) References Cited

U.S. PATENT DOCUMENTS

| | | | | | |
|---|---|---|---|---|---|
| 3,184,201 | A * | 5/1965 | Smith | B63B 29/12 | 131/241 |
| 3,734,439 | A * | 5/1973 | Wintz | A47G 23/0241 | 248/230.8 |
| 4,437,596 | A * | 3/1984 | Shook | B62J 11/04 | 224/450 |
| 5,101,845 | A * | 4/1992 | Kravetz | A61H 3/02 | 224/407 |
| 5,190,257 | A * | 3/1993 | Gradei | E06C 7/14 | 248/231.71 |
| 5,484,129 | A * | 1/1996 | Megal | A63B 55/408 | 248/311.2 |
| 5,522,527 | A * | 6/1996 | Tsai | B62J 29/00 | 224/558 |
| 5,647,519 | A * | 7/1997 | Brennan | A61H 3/02 | 224/407 |
| 5,687,874 | A * | 11/1997 | Omori | B65B 43/54 | 220/737 |
| 5,803,327 | A | 9/1998 | Nipper et al. | | |
| 5,845,806 | A | 12/1998 | Parchman | | |
| 6,302,364 | B1 * | 10/2001 | Chiueh | B60N 3/10 | 206/545 |
| 6,637,617 | B2 * | 10/2003 | Eisenbraun | B60N 3/108 | 220/737 |
| 9,107,481 | B2 * | 8/2015 | Catchings | A61G 5/10 | |
| 9,545,355 | B1 * | 1/2017 | Welch | A61H 3/02 | |
| 10,143,614 | B1 * | 12/2018 | Pelletier | A61H 3/02 | |
| 10,315,551 | B2 * | 6/2019 | Filipovich | B60R 11/02 | |
| 10,780,812 | B2 * | 9/2020 | Filipovich | B60N 3/106 | |
| 11,040,832 | B2 * | 6/2021 | Lunn | B67C 3/24 | |
| 11,135,125 | B2 * | 10/2021 | Johnson | A45B 1/00 | |
| 11,617,703 | B2 * | 4/2023 | Johnson | A61H 3/02 | 224/407 |
| 2004/0031895 | A1 | 2/2004 | Langhoff | | |
| 2015/0001359 | A1 * | 1/2015 | Catchings | F16M 11/14 | 248/220.22 |

OTHER PUBLICATIONS

International Search Report—PCT/US2020/047625 mailing date Nov. 4, 2020—2 pages.

Written Opinion—PCT/US2020/047625 mailing date Nov. 4, 2020—5 pages.

* cited by examiner

CRUTCH AUXILIARY CARRYING DEVICE AND KIT

PRIORITY CLAIM

The present application claims priority to and the benefit of provisional U.S. Patent Application No. 62/892,907 entitled Crutch Auxiliary Carrying Device And Kit, filed Aug. 28, 2019, the entire contents of which are incorporated herein by reference and relied upon.

BACKGROUND OF THE PRESENT DISCLOSURE

Internet research suggests that between seven (7) and ten (10) million pairs of crutches are sold in the United States per year. The use of crutches therefore seems fairly prevalent.

Crutches are often used for people with leg injuries that restrict the amount of weight that they can bear on a leg. Common injuries requiring use of crutches include sports injuries such as from running or skiing, slips or falls, car accidents, etc. Restrictions on weight bearing may also arise from surgeries for fixing bone or tendon issues. For some people, weight bearing restrictions may be partial or full and may last from a few days to a few months.

One common type of crutch is the axilla or underarm crutch. The crutches have a y-shape with a head or pad top, two rails and a leg for contacting the ground. Such crutches are often made of aluminum tubes or wood.

Users of such crutches face many challenges. They need arm strength to support their weight, the top pad of the crutch can cause nerve damage under the arm if not used correctly, stairs or curbs are difficult, and a wide area is needed to operate them, etc. Users also complain that walking with the crutches tires them and can leave arms, underarms, and/or legs sore. The users should also be careful not to fall while using crutches because they already have a leg injury that could be exacerbated by a fall.

One additional challenge that users face is that their hands should be fully engaged on the handles to control operation, support their weight, and avoid falls. This makes it very difficult for the user to carry anything. Carrying anything with the hands would make the use of crutches potentially unsafe.

The prior art includes carrying devices for crutches in the form of small or large backpack type structures that are attached to a crutch. However, backpack type structures are often made of canvas, denim or other durable fabrics that are heavy. This heavy weight may impede or hinder the use of the crutch. Further, objects in the backpack type structure may be free to move in the open space of the backpack. When the user swings the crutch forward and backward in use, objects such as a laptop may swing back and forth within the backpack casing a jarring action on the crutch and impede or hinder the operation by the user or create an unsafe condition.

SUMMARY

One objective of the present disclosure is therefore to have a crutch auxiliary carrying device and kit that is lightweight and will secure objects to minimize jarring motions when the crutches are used.

In an aspect, which may be combined with any other aspect or portion thereof, an auxiliary carrying device for crutches comprises: a clip including a base having a surface shaped to conform to a crutch rail, (i) an aperture through the base for receiving a connector to connect to the crutch via a hole in the rail of the crutch or (ii) a stud extending from the base for insertion through the hole in the rail of the crutch, and two arms extending outward from the base, the arms configured to secure a holder; and wherein the holder includes a bottom, at least one side and an interior cavity, the holder including an inflatable body such that the at least one side is compressible and expandable to conform to objects inserted into the interior cavity.

In an aspect, which may be combined with any other aspect or portion thereof, the arms include tips for engaging the holder.

In an aspect, which may be combined with any other aspect or portion thereof, the tips extend inwardly for engaging and compressing the holder.

In an aspect, which may be combined with any other aspect or portion thereof, the holder includes an indent for receiving the arms of the clip.

In an aspect, which may be combined with any other aspect or portion thereof, the indent includes an annular ring.

In an aspect, which may be combined with any other aspect or portion thereof, the holder is cylindrical.

In an aspect, which may be combined with any other aspect or portion thereof, the interior cavity is cylindrical.

In an aspect, which may be combined with any other aspect or portion thereof, the interior cavity includes inflatable ridges for engaging objects inserted in the cavity.

In an aspect, which may be combined with any other aspect or portion thereof, the inflatable ridges deform upon insertion of the object to form a firm hold.

In an aspect, which may be combined with any other aspect or portion thereof, the inflatable ridges extend around the inner periphery of the interior cavity.

In an aspect, which may be combined with any other aspect or portion thereof, the interior cavity of the body includes at least one sidewall that converges inwardly from the top of the cavity to the bottom of the cavity.

In an aspect, which may be combined with any other aspect or portion thereof, the holder includes an outer shape of a trapezoid, and wherein the interior cavity has the shape of a trapezoid.

In an aspect, which may be combined with any other aspect or portion thereof, the holder includes a plurality of outer shapes and a plurality of inner shapes adapted to secure objects of different shapes and/or sizes.

In an aspect, which may be combined with any other aspect or portion thereof, the plurality of outer shapes comprises a partial cylinder and a partial rectangle.

In an aspect, which may be combined with any other aspect or portion thereof, the holder includes a plurality of inner cavities having different shapes.

In an aspect, which may be combined with any other aspect or portion thereof, the plurality of inner cavity shapes include at least two of a cylinder, a rectangle and cylindrical hole.

In an aspect, which may be combined with any other aspect or portion thereof, a crutch including an auxiliary carrying device includes: a top pad, a plurality of rails extending from the top pad, a handle extending between the rails, and a leg connected to the rails for contacting the ground, the rails further including a plurality of holes for permitting insertion of connectors for holding the handle; and a clip including a base having a surface shaped to conform to a crutch rail, (i) an aperture through the base for receiving a connector to connect to the crutch via a selected one of the holes in the rail of the crutch or (ii) a stud extending from the base for insertion through the selected hole in the rail of the crutch, and two arms extending outward from the base, the arms configured to secure a holder, wherein the holder includes a bottom, sides and an interior cavity, the holder including an inflatable body such that the sides are compressible and expandable to conform to objects inserted into the interior cavity.

In an aspect, which may be combined with any other aspect or portion thereof, the arms include tips for engaging the holder.

In an aspect, which may be combined with any other aspect or portion thereof, the tips extend inwardly for engaging and compressing the holder.

In an aspect, which may be combined with any other aspect or portion thereof, the holder includes an indent for receiving the arms of the clip.

In an aspect, which may be combined with any other aspect or portion thereof, the indent includes an annular ring.

In an aspect, which may be combined with any other aspect or portion thereof, the holder is cylindrical.

In an aspect, which may be combined with any other aspect or portion thereof, the interior cavity is cylindrical.

In an aspect, which may be combined with any other aspect or portion thereof, the interior cavity includes inflatable ridges for engaging objects inserted in the cavity.

In an aspect, which may be combined with any other aspect or portion thereof, the inflatable ridges deform upon insertion of the object to form a firm hold.

In an aspect, which may be combined with any other aspect or portion thereof, the inflatable ridges extend around the inner periphery of the interior cavity.

In an aspect, which may be combined with any other aspect or portion thereof, the interior cavity of the body includes sidewalls that converge inwardly from the top of the cavity to the bottom of the cavity.

In an aspect, which may be combined with any other aspect or portion thereof, the holder includes an outer shape of a trapezoid, and wherein the interior cavity has the shape of a trapezoid.

In an aspect, which may be combined with any other aspect or portion thereof, the holder includes a plurality of outer shapes and a plurality of inner shapes adapted to secure objects of different sizes.

In an aspect, which may be combined with any other aspect or portion thereof, the plurality of outer shapes include a partial cylinder and a partial rectangle.

In an aspect, which may be combined with any other aspect or portion thereof, the holder includes a plurality of inner cavities having different shapes.

In an aspect, which may be combined with any other aspect or portion thereof, the plurality of inner cavities include a cylinder, a rectangle and a cylindrical hole.

In an aspect, which may be combined with any other aspect or portion thereof, a kit for providing auxiliary carrying device for crutches includes: a clip including a base having a surface shaped to conform to a crutch rail, (i) an aperture through the base for receiving a connector to connect to the crutch via a hole in the rail of the crutch or (ii) a stud extending from the base for insertion through the hole in the rail of the crutch, and two arms extending outward from the base, the arms configured to secure any one of a plurality of holders; and wherein the plurality of holders define a bottom, sides and an interior cavity, at least one of the holders including an inflatable body such that the sides are compressible and expandable to conform to objects inserted into the interior cavity.

In an aspect, which may be combined with any other aspect or portion thereof, the arms include tips for engaging one of the plurality of holders.

In an aspect, which may be combined with any other aspect or portion thereof, the tips extend inwardly for engaging and compressing the holder.

In an aspect, which may be combined with any other aspect or portion thereof, at least one of the holders includes an indent for receiving the arms of the clip.

In an aspect, which may be combined with any other aspect or portion thereof, the indent comprises an annular ring.

In an aspect, which may be combined with any other aspect or portion thereof, at least one of the plurality of the holders includes a cylindrical shape.

In an aspect, which may be combined with any other aspect or portion thereof, the interior cavity of at least one of the plurality of holders is cylindrical.

In an aspect, which may be combined with any other aspect or portion thereof, at least one of the interior cavities includes inflatable ridges for engaging objects inserted in the cavity.

In an aspect, which may be combined with any other aspect or portion thereof, the inflatable ridges deform upon insertion of the object to form a firm hold.

In an aspect, which may be combined with any other aspect or portion thereof, the inflatable ridges extend around the inner periphery of the interior cavity.

In an aspect, which may be combined with any other aspect or portion thereof, the interior cavity of at least one of the bodies includes sidewalls that converge inwardly from the top of the at least one cavity to the bottom of the at least one cavity.

In an aspect, which may be combined with any other aspect or portion thereof, the plurality of holders includes a cylindrical holder and a rectangular holder.

DETAILED DESCRIPTION

Figure 1:
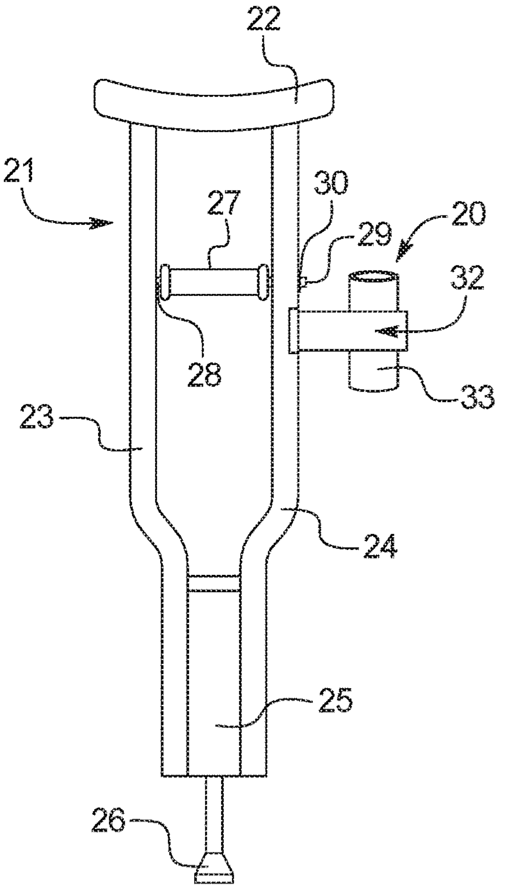
FIG. 1 is a perspective view of a crutch and auxiliary carrying device according to an embodiment of the present disclosure.

FIG. 1 illustrates an auxiliary carrying device generally designated at 20 attached to a crutch 21. The crutch 21 may be conventional and of the type known as an underarm or axilla crutch. One common crutch is made of aluminum or other light weight metal tubing. The crutch may also be wooden, plastic, a composite material or of another conventional crutch material.

The crutch 21 generally includes a top pad 22 and two rails 23 and 24 extending from the top pad 22. The rails 23 and 24 engage at the other end to a leg 25 adapted to engage the ground. The leg 25 may include a rubber base 26 or other surface for engaging the ground. The crutch 21 further includes a handle 27 generally extending between and perpendicular to the two rails 23 and 24. A connector 28 secures the handle 27 to the rails 23 and 24 such that a person may put their full weight on the handle. The connector 28 may be of any conventional type. In the embodiment shown, the connector 28 includes a bolt 29 and wing nuts 30.

Figure 1A:
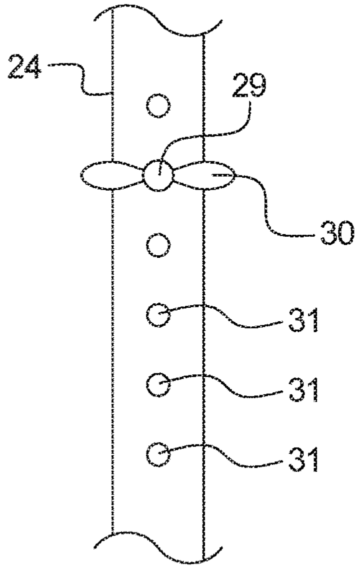
FIG. 1A is an expanded view of a crutch rail according to an embodiment of the present disclosure.
Figure 2:
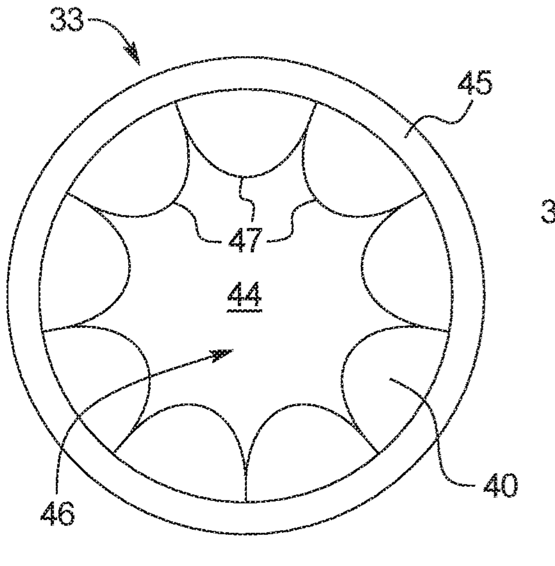
FIG. 2 is a top view of a holder according to an embodiment of the present disclosure.

FIG. 1A is a closer view of the crutch rail 24, bolt 29 and wing nut 30. As illustrated, the rail 24 (and rail 23) includes a plurality of apertures or holes 31 that pass through the rail 24. The holes 31 are conventional and permit the handle 27 to be connected at one of a plurality of positions to adapt to the user's height and particular fit.

Figure 3:
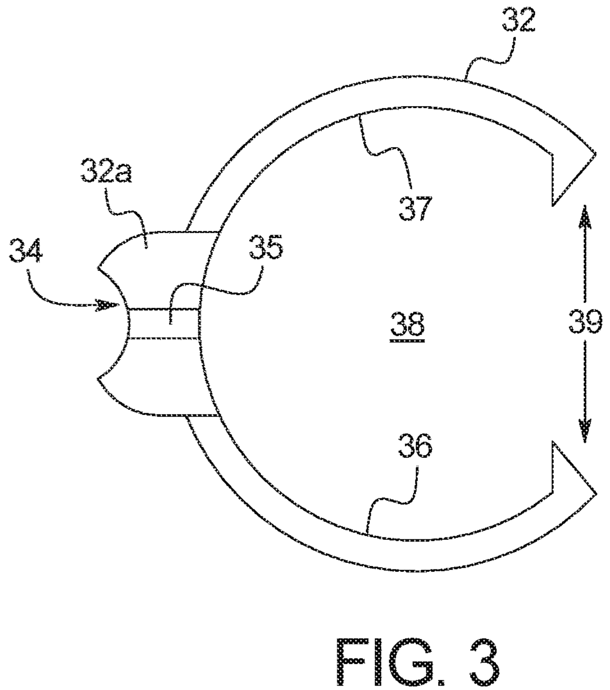
FIG. 3 is a top view of a clip according to an embodiment of the present disclosure.
Figure 4:
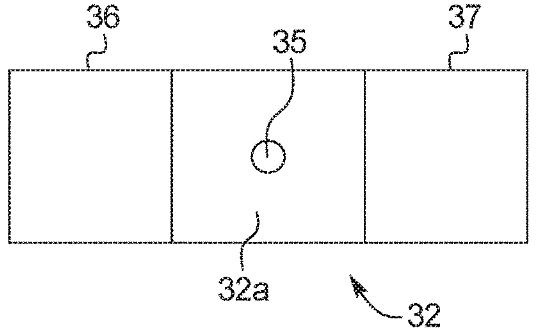
FIG. 4 is a side view of a clip according to an embodiment of the present disclosure.
Figure 5:
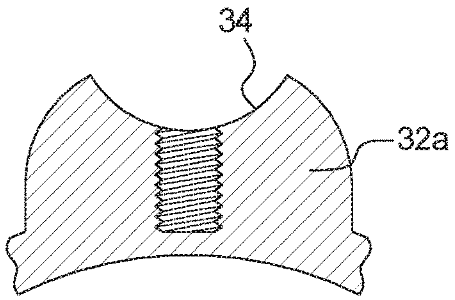
FIG. 5 is a cross-sectional view of a clip according to an embodiment of the present disclosure.

Referring to FIG. 1, the auxiliary carrying device 20 includes a clip 32 and a holder 33. As shown in more detail in FIGS. 3, 4 and 5, clip 32 includes a base 32 a having a surface 34 shaped to conform to a crutch rail. In the embodiment shown, the surface 34 is curved or arcuate but may be any shape needed to conform to the rails of a crutch. The base 32 a includes or defines an aperture 35 through the base for receiving a connector to connect to a hole in the rail of the crutch. The connector may take the form of a bolt 29 passing through aperture 35 in the base 32 a and hole 31 in the rail of the crutch, or be other suitable connectors. The base 32*a* is securely and firmly held to the rail 23 or 24 of the crutch so that it will not move during use of the crutch.

The clip 32 further includes two arms 36 and 37 extending outward from the base 32*a* and which are adapted to secure a holder 33. In the embodiment shown, the arms 36 and 37 are curved to form a generally circular space 38 between them and a gap 39. The arms 36 and 37 are made of a resilient and flexible or bendable material, such as a polymer, rubber, a bendable metal or a composite material. Materials that are light in weight are preferred in one embodiment.

Figure 6:
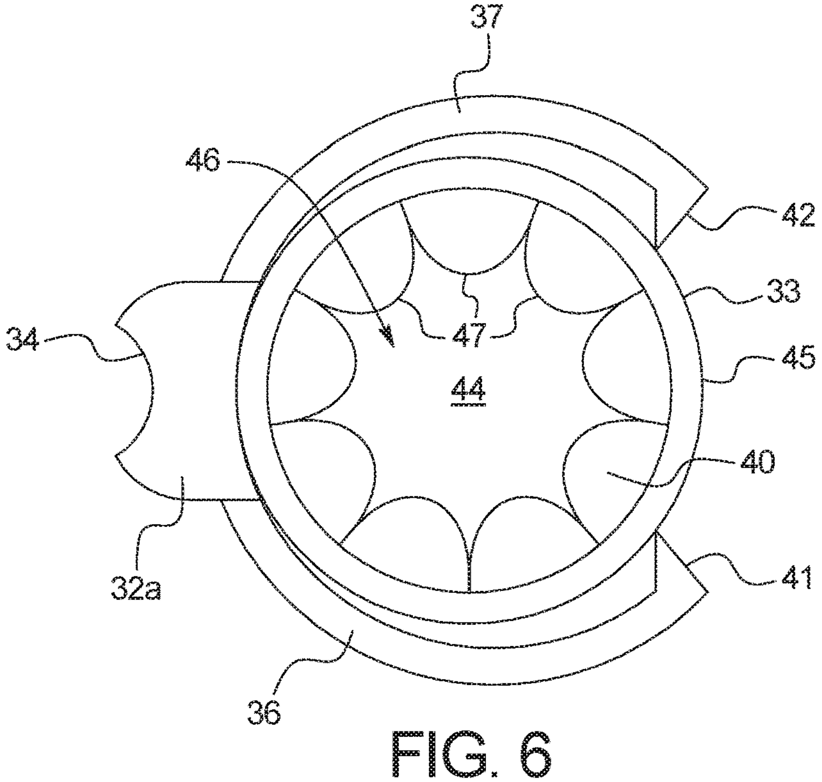
FIG. 6 is a top view of a holder according to an embodiment of the present disclosure.

Referring to FIGS. 1 to 3 and 6, the user may push holder 33 into the gap 39, flex arms 36 and 37 outwardly, and then continue to push holder 33 into the circular space 38, where the holder 33 becomes firmly secured between arms 36 and 37, as shown in particular FIGS. 1 and 6.

As will be described in more detail below, holder 33 in one embodiment comprises an inflatable body 40 that is compressible and expandable. As shown in FIG. 6, arms 36 and 37 may further include means for gripping the inflatable body 40 to ensure a firm securement of holder 33. In the embodiment shown, the means for gripping include tips 41 and 42, which are adapted to press into and compress the inflatable body 40. The tips 41 and 42 ensure a firm grasp on holder 33 when the crutches are in use.

Figure 6A:
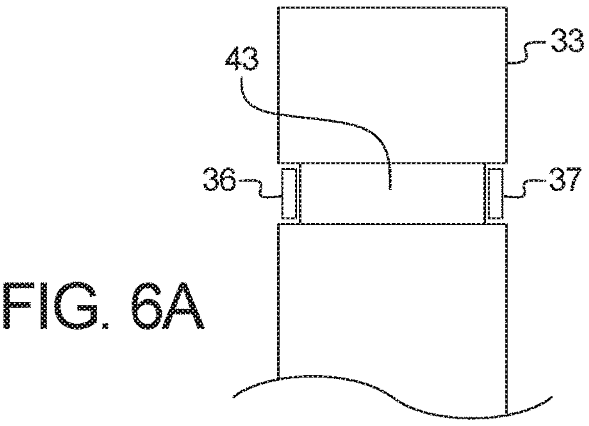
FIG. 6A is a side view of a crutch auxiliary carrying device according to an embodiment of the present disclosure.

In an alternative embodiment shown in FIG. 6A, holder 33 includes an indent 43, which may be an annular ring. The indent 43 is adapted to receive arms 36 and 37 and thus lock the holder 33 in place in the clip 32 and ensure a firm hold during use of the crutches.

Referring again to FIGS. 2 and 6, the holder 33 in the illustrated embodiment includes a cylinder with a bottom 44, sidewalls 45, and an opening 46. Due to the cylindrical shape, the holder 33 is particularly adapted to hold a water bottle or other similar objects. The inflatable body 40 is compressible and expandable so that the water bottle (or other item) can be pushed into the opening 46, compress the body 40, and thus have a snug fit. The snug fit prevents the water bottle from moving and causing a jarring motion when the crutches are used.

In the embodiment shown, inflatable body 40 further includes a plurality of inflatable ridges 47 around the inner periphery of the cylindrical sidewall 45. The ridges 47 are shown extending around the entire periphery, but only a few ridges 47 may be provided in alternative embodiments. The ridges 47 are compressible and expandable to further provide a snug fit when a water bottle or other object is placed in the holder 33, to prevent movement of that object with respect to the holder and therefore avoid any jarring action when the crutches are used.

Figure 7:
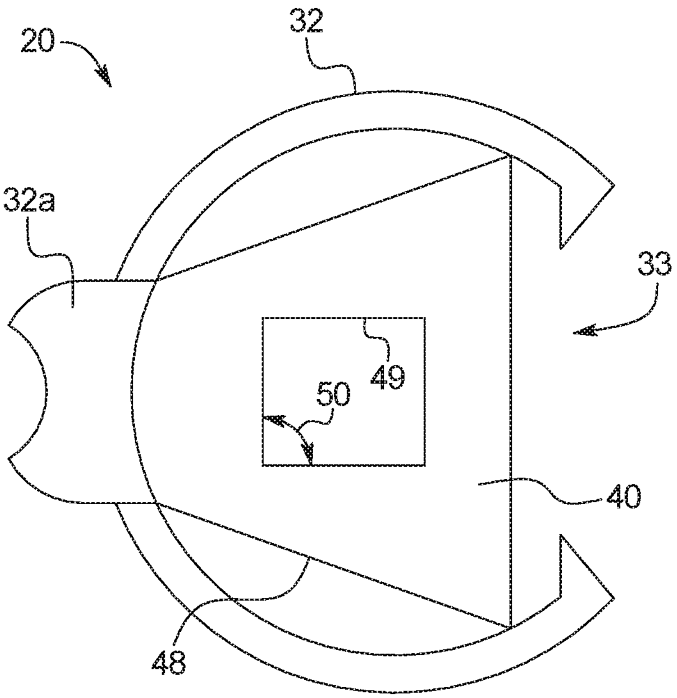
FIG. 7 is a top view of a crutch auxiliary carrying device according to an embodiment of the present disclosure.

FIG. 7 shows an alternative embodiment of the auxiliary carrying device for crutches 20 of the present disclosure. The holder 33 in FIG. 7 includes inflatable body 40 having a trapezoid outer shape 48 and an inner square shaped cavity 49. Clip 32 securely holds the trapezoid 48. The inner square shaped cavity 49 has edges 50 that permit a variety of objects, such as wallets, cell phones, tables, etc., to be wedged into the cavity 49 such that inflatable body 40 is compressed to firmly or snugly hold such objects.

Figure 8:
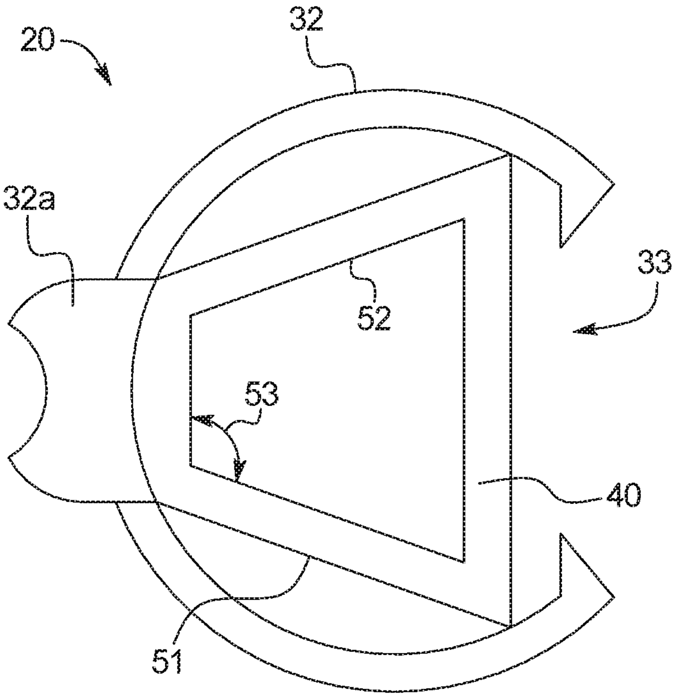
FIG. 8 is a top view of a crutch auxiliary carrying device according to an embodiment of the present disclosure.

FIG. 8 shows an alternative embodiment of the auxiliary carrying device for crutches 20. The holder 33 in FIG. 8 includes inflatable body 40 having an alternative trapezoid outer shape 51 and an inner trapezoid shaped cavity 52. Clip 32 securely holds the trapezoid 51. The trapezoid shaped cavity 51 has edges 53 that permit a variety of objects, such as wallets, cell phones, tablets, etc., to be wedged into the cavity 51 such that inflatable body 40 is compressed to firmly or snugly hold such objects.

Figure 9:
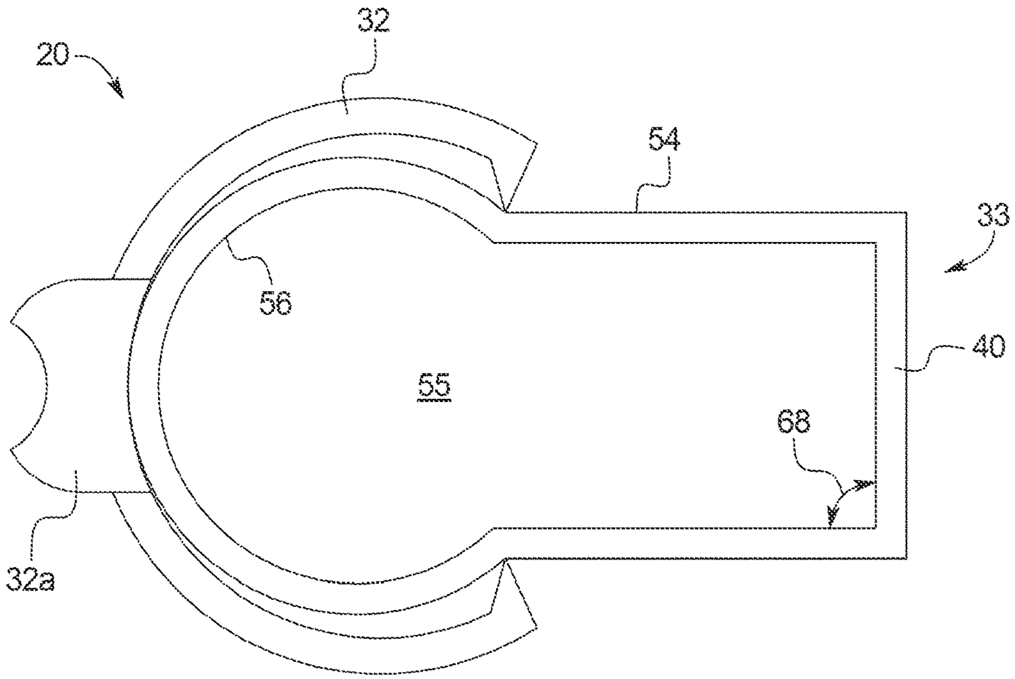
FIG. 9 is a top view of a crutch auxiliary carrying device according to an embodiment of the present disclosure.

FIG. 9 shows an alternative embodiment of the auxiliary carrying device for crutches 20. The holder 33 of FIG. 9 includes inflatable body 40 having (i) a half cylindrical and half square outer shape 54 and (ii) a half cylindrical and half square shaped cavity 55. Clip 32 securely holds the body 40. The inner cavity 55 has a cylindrical shape 56 adapted to firmly hold objects, such as water bottles, flashlights, etc., while squared edges 68 permit a variety of objects, such as wallets, cell phones, tables, to be wedged into the cavity 55 such that inflatable body 40 is compressed to firmly hold such objects. This embodiment has the advantage of having two differently shaped inner cavities each adapted to hold objects of a variety of sizes, from water bottles to electronics.

Figure 11:
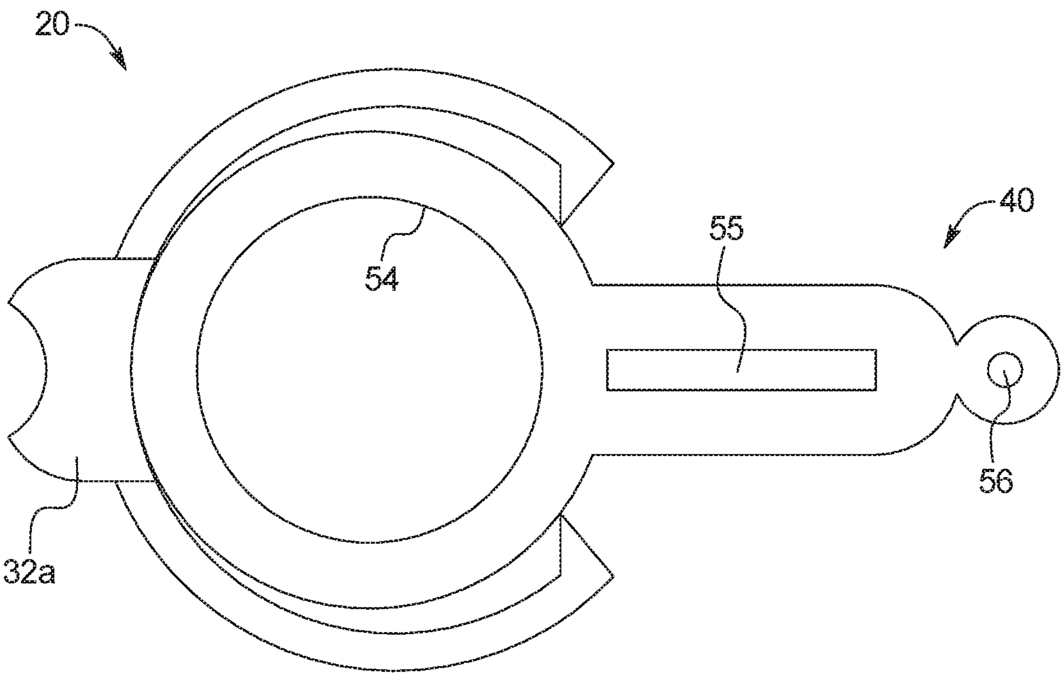
FIG. 11 is a top view of a crutch auxiliary carrying device according to an embodiment of the present disclosure.

FIG. 11 shows yet another alternative embodiment of auxiliary carrying device 20 including a holder 33 in the form of inflatable body 40 having a plurality of cavities in a variety of shapes to be able to snuggly hold a wide variety of objects. Body 40 in the illustrated embodiment includes a cylindrical cavity 54, a square, rectangular or other polygon-shaped cavity 55 and a cavity 56 having or forming one or more aperture. A snug fit for a variety of objects can be accomplished in inflatable body 40, e.g., with water bottles located in cavity 54, wallets, phones, or notebooks in located in cavity 55, and one or more smaller object such as pencils, pens, and similar objects located in cavity 56.

Inflatable body 40 may be made from a light weight material, e.g., plastic, which may be similar to or the same as found in common inflatable pool rafts. Inflatable body 40 includes a standard plug 40*a* (FIG. 12) that can be opened, air can be blown by mouth into the body (e.g., via an inflation tube not illustrated) to inflate body 40 to the desired size and rigidity, which is thereafter resealed. As described above, by being inflatable, body 40 is lightweight and malleable to provide firm or snug fits for carrying a wide variety of shapes of objects.

Figure 10:
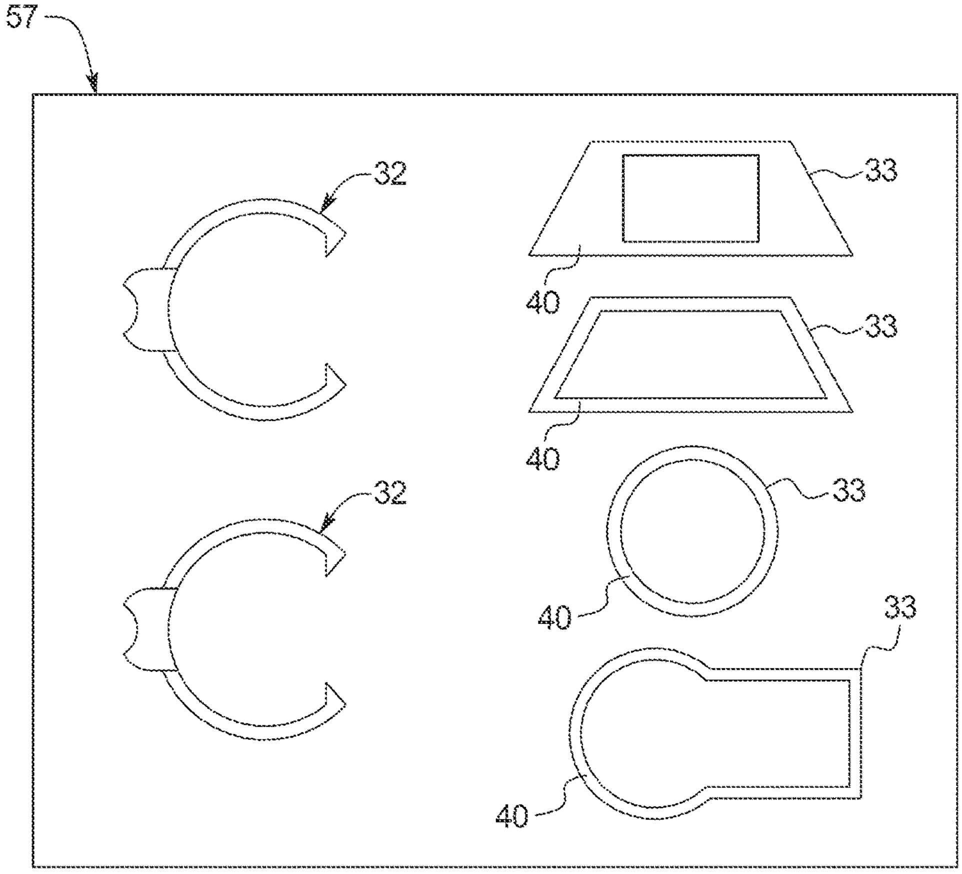
FIG. 10 is a top view of a kit for a crutch auxiliary carrying device according to an embodiment of the present disclosure.

FIG. 10 illustrates a kit 57 that includes at least one clip 32 and a plurality of holders 33 in the form of inflatable bodies 40. The kit 57 allows users to select a holder 33 for whatever use is needed at the time, such as holding water or other bottles, calculators, wallets, notebooks, phones, tablets, food items, etc., permitting the user to select the correct holder 40 to provide a snug fit for the desired object.

Figure 12:
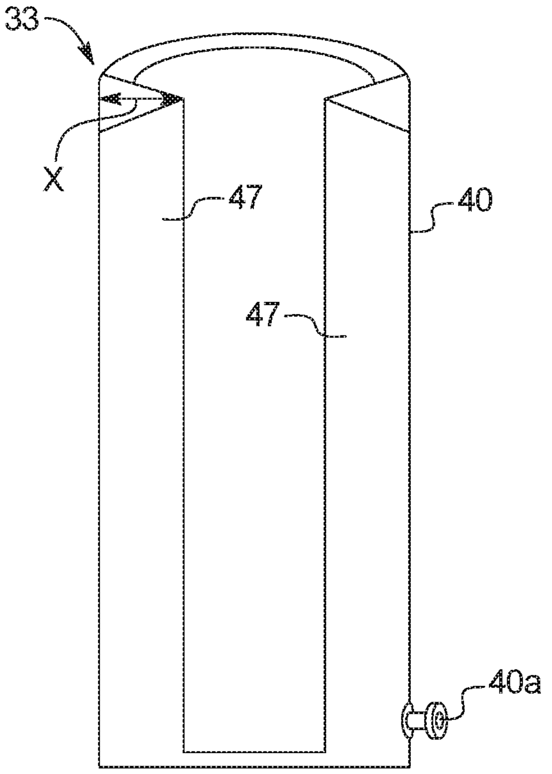
FIG. 12 is a side view of a crutch auxiliary carrying device according to an embodiment of the present disclosure.
Figure 13:
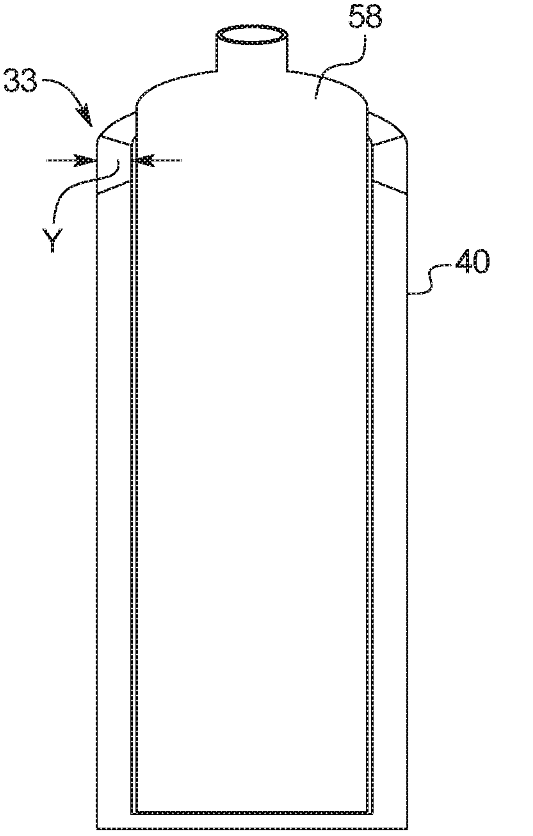
FIG. 13 is a side view of a crutch auxiliary carrying device according to an embodiment of the present disclosure.

FIGS. 12 and 13 further illustrate holder 33 comprising inflatable body 40 and the manner in which body 40 provides a firm or snug fit for objects, such as water bottle 58 in the illustrated example. In this example, body includes two inflatable ridges 47. In FIG. 12, the inflatable ridges 47 are not compressed and have a length x. In FIG. 13, the inflatable ridges 47 are compressed by the insertion of water bottle 58 and have a length y less than x to illustrate the compression of the ridges 47 and the provision of a firm or snug fit about an object such as water bottle 58 in the illustrated example.

Figure 14:
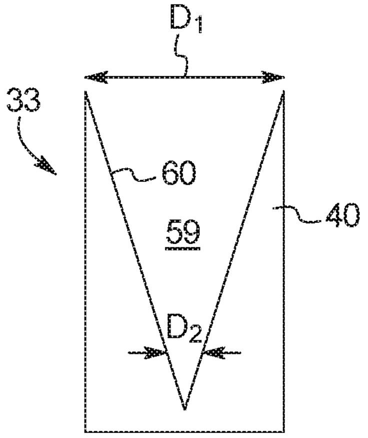
FIG. 14 is a side view of a crutch auxiliary carrying device according to an embodiment of the present disclosure.
Figure 15:
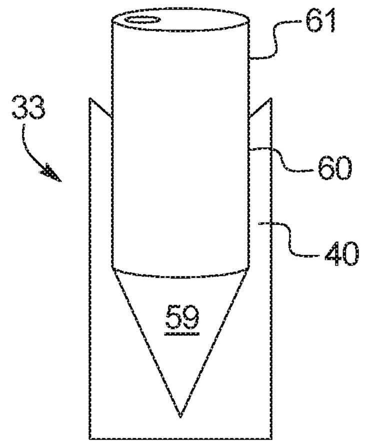
FIG. 15 is a side view of a crutch auxiliary carrying device according to an embodiment of the present disclosure.
Figure 16:
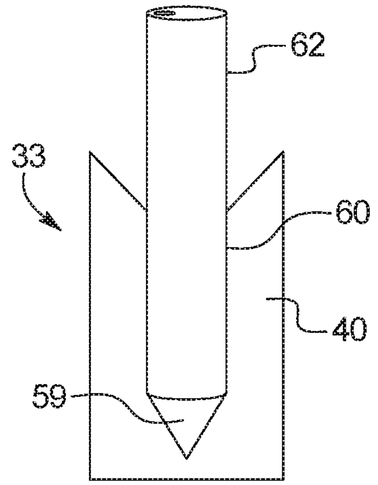
FIG. 16 is a side view of a crutch auxiliary carrying device according to an embodiment of the present disclosure.

FIGS. 14, 15, and 16 illustrate a further embodiment of the holder 33 and inflatable body 40. Inflatable body 40 defines an interior cavity 59 having sidewalls 60 that slope inwardly from a larger diameter D1 to a smaller diameter D2. The sidewalls 60 are compressed and deformed inwardly to conform to a variety of inserted objects having different diameters, sizes and/or shapes. In the illustrated example, FIG. 15 shows a beverage can 61 inserted into the body 40 and sidewalls 60 deformed to provide a firm or snug fit about the can 61 having a relatively wide diameter. In FIG. 16, a beverage can 62 has a relatively smaller diameter, such as an energy drink can, but body 40 and sidewalls 60 still deform to provide a firm and snug fit for the can 62 of smaller diameter. As illustrated, the interior cavity formed by sidewalls 60 of the body 40 converge inwardly from the top of the cavity to the bottom of the cavity to accommodate objects having a wide variety of outer profiles, shapes and sizes, but wherein body and sidewalls 60 nevertheless provide a firm and snug fit to the object.

It should be understood that various changes and modifications to the presently preferred embodiments described herein will be apparent to those skilled in the art. It is therefore intended that such changes and modifications be covered by the appended claims. For example, while inflatable body 40 has been described as being filled with a compressible fluid, such as air, inflatable body 40 may alternatively be filled with an incompressible fluid, such as a gel or water. Also, while crutch 21 is shown being provided with a single auxiliary carrying device 20, a plurality of auxiliary carrying devices 20 may be provided for a single crutch 21. Further, one or more inflatable body 40 may be provided directly with arms 36 and 37 instead of with holder 33 carried by arms 36 and 37. Moreover, base 32*a* may alternatively include a stud, e.g., a threaded stud, instead of aperture 35, for extending through hole 31 in the rail of the crutch.

The invention claimed is:

1. An auxiliary carrying device for crutches comprising:

a clip including a base having a surface shaped to conform to a crutch rail, (i) an aperture through the base for receiving a connector to connect to the crutch via a hole in the rail of the crutch or (ii) a stud extending from the base for insertion through the hole in the rail of the crutch, and two arms extending outward from the base, the arms configured to secure a holder; and wherein the holder includes a bottom, at least one side and an interior cavity, the holder including an inflatable body such that the at least one side is compressible and expandable to conform to objects inserted into the interior cavity, wherein the arms include tips for engaging the holder, wherein the tips extend inwardly for engaging and compressing the holder.

2. An auxiliary carrying device for crutches comprising:

a clip including a base having a surface shaped to conform to a crutch rail, (i) an aperture through the base for receiving a connector to connect to the crutch via a hole in the rail of the crutch or (ii) a stud extending from the base for insertion through the hole in the rail of the crutch, and two arms extending outward from the base, the arms configured to secure a holder, and wherein the holder includes a bottom, at least one side and an interior cavity, the holder including an inflatable body such that the at least one side is compressible and expandable to conform to objects inserted into the interior cavity, wherein the holder includes an indent for receiving the arms of the clip.

3. The device of claim 2, wherein the indent includes an annular ring.

4. An auxiliary carrying device for crutches comprising:

a clip including a base having a surface shaped to conform to a crutch rail, (i) an aperture through the base for receiving a connector to connect to the crutch via a hole in the rail of the crutch or (ii) a stud extending from the base for insertion through the hole in the rail of the crutch, and two arms extending outward from the base, the arms configured to secure a holder; and wherein the holder includes a bottom, at least one side and an interior cavity, the holder including an inflatable body such that the at least one side is compressible and expandable to conform to objects inserted into the interior cavity, wherein the holder includes an outer shape of a trapezoid, and wherein the interior cavity has the shape of a trapezoid.

5. An auxiliary carrying device for crutches comprising:

a clip including a base having a surface shaped to conform to a crutch rail, (i) an aperture through the base for receiving a connector to connect to the crutch via a hole in the rail of the crutch or (ii) a stud extending from the base for insertion through the hole in the rail of the crutch, and two arms extending outward from the base, the arms configured to secure a holder; and wherein the holder includes a bottom, at least one side and an interior cavity, the holder including an inflatable body such that the at least one side is compressible and expandable to conform to objects inserted into the interior cavity, wherein the holder includes a plurality of outer shapes and a plurality of inner shapes adapted to secure objects of different shapes and/or sizes.

6. The device of claim 5, wherein the plurality of outer shapes comprises a partial cylinder and a partial rectangle.

7. An auxiliary carrying device for crutches comprising:

a clip including a base having a surface shaped to conform to a crutch rail, (i) an aperture through the base for receiving a connector to connect to the crutch via a hole in the rail of the crutch or (ii) a stud extending from the base for insertion through the hole in the rail of the crutch, and two arms extending outward from the base, the arms configured to secure a holder; and wherein the holder includes a bottom, at least one side and an interior cavity, the holder including an inflatable body such that the at least one side is compressible and expandable to conform to objects inserted into the interior cavity, wherein the holder includes a plurality of inner cavities having different shapes.

8. The device of claim 7, wherein the plurality of inner cavity shapes include at least two of a cylinder, a rectangle and cylindrical hole.

9. A crutch including an auxiliary carrying device comprising:

a top pad, a plurality of rails extending from the top pad, a handle extending between the rails, and a leg connected to the rails for contacting the ground, the rails further including a plurality of holes for permitting insertion of connectors for holding the handle; and a clip including a base having a surface shaped to conform to a crutch rail, (i) an aperture through the base for receiving a connector to connect to the crutch via a selected one of the holes in the rail of the crutch or (ii) a stud extending from the base for insertion through the selected hole in the rail of the crutch, and two arms extending outward from the base, the arms configured to secure a holder, wherein the holder includes a bottom, sides and an interior cavity, the holder including an inflatable body such that the sides are compressible and expandable to conform to objects inserted into the interior cavity, wherein the arms include tips for engaging the holder, wherein the tips extend inwardly for engaging and compressing the holder.

10. A crutch including an auxiliary carrying device comprising:

a top pad, a plurality of rails extending from the top pad, a handle extending between the rails, and a leg connected to the rails for contacting the ground, the rails further including a plurality of holes for permitting insertion of connectors for holding the handle; and a clip including a base having a surface shaped to conform to a crutch rail, (i) an aperture through the base for receiving a connector to connect to the crutch via a selected one of the holes in the rail of the crutch or (ii) a stud extending from the base for insertion through the selected hole in the rail of the crutch, and two arms extending outward from the base, the arms configured to secure a holder, wherein the holder includes a bottom, sides and an interior cavity, the holder including an inflatable body such that the sides are compressible and expandable to conform to objects inserted into the interior cavity, wherein the holder includes an indent for receiving the arms of the clip.

11. The device of claim 10, wherein the indent includes an annular ring.

12. A crutch including an auxiliary carrying device comprising:

a top pad, a plurality of rails extending from the top pad, a handle extending between the rails, and a leg connected to the rails for contacting the ground, the rails further including a plurality of holes for permitting insertion of connectors for holding the handle; and a clip including a base having a surface shaped to conform to a crutch rail, (i) an aperture through the base for receiving a connector to connect to the crutch via a selected one of the holes in the rail of the crutch or (ii) a stud extending from the base for insertion through the selected hole in the rail of the crutch, and two arms extending outward from the base, the arms configured to secure a holder, wherein the holder includes a bottom, sides and an interior cavity, the holder including an inflatable body such that the sides are compressible and expandable to conform to objects inserted into the interior cavity, wherein the holder includes an outer shape of a trapezoid, and wherein the interior cavity has the shape of a trapezoid.

13. A crutch including an auxiliary carrying device comprising:

a top pad, a plurality of rails extending from the top pad, a handle extending between the rails, and a leg connected to the rails for contacting the ground, the rails further including a plurality of holes for permitting insertion of connectors for holding the handle; and a clip including a base having a surface shaped to conform to a crutch rail, (i) an aperture through the base for receiving a connector to connect to the crutch via a selected one of the holes in the rail of the crutch or (ii) a stud extending from the base for insertion through the selected hole in the rail of the crutch, and two arms extending outward from the base, the arms configured to secure a holder, wherein the holder includes a bottom, sides and an interior cavity, the holder including an inflatable body such that the sides are compressible and expandable to conform to objects inserted into the interior cavity, wherein the holder includes a plurality of outer shapes and a plurality of inner shapes adapted to secure objects of different sizes.

14. A crutch including an auxiliary carrying device comprising:

a top pad, a plurality of rails extending from the top pad, a handle extending between the rails, and a leg connected to the rails for contacting the ground, the rails further including a plurality of holes for permitting insertion of connectors for holding the handle; and a clip including a base having a surface shaped to conform to a crutch rail, (i) an aperture through the base for receiving a connector to connect to the crutch via a selected one of the holes in the rail of the crutch or (ii) a stud extending from the base for insertion through the selected hole in the rail of the crutch, and two arms extending outward from the base, the arms configured to secure a holder, wherein the holder includes a bottom, sides and an interior cavity, the holder including an inflatable body such that the sides are compressible and expandable to conform to objects inserted into the interior cavity, wherein the plurality of outer shapes include a partial cylinder and a partial rectangle.

15. A crutch including an auxiliary carrying device comprising:

a top pad, a plurality of rails extending from the top pad, a handle extending between the rails, and a leg connected to the rails for contacting the ground, the rails further including a plurality of holes for permitting insertion of connectors for holding the handle; and a clip including a base having a surface shaped to conform to a crutch rail, (i) an aperture through the base for receiving a connector to connect to the crutch via a selected one of the holes in the rail of the crutch or (ii) a stud extending from the base for insertion through the selected hole in the rail of the crutch, and two arms extending outward from the base, the arms configured to secure a holder, wherein the holder includes a bottom, sides and an interior cavity, the holder including an inflatable body such that the sides are compressible and expandable to conform to objects inserted into the interior cavity, wherein the holder includes a plurality of inner cavities having different shapes.

16. The device of claim 15, wherein the plurality of inner cavities include a cylinder, a rectangle and a cylindrical hole.

17. A kit for providing auxiliary carrying device for crutches comprising:

a clip including a base having a surface shaped to conform to a crutch rail, (i) an aperture through the base for receiving a connector to connect to the crutch via a hole in the rail of the crutch or (ii) a stud extending from the base for insertion through the hole in the rail of the crutch, and two arms extending outward from the base, the arms configured to secure any one of a plurality of holders; and wherein each of the plurality of holders defines a bottom, sides and an interior cavity, at least one of the plurality of holders including an inflatable body such that the sides are compressible and expandable to conform to objects inserted into the interior cavity.

18. The kit of claim 17, wherein the arms include tips for engaging one of the plurality of holders.

19. The kit of claim 18, wherein the tips extend inwardly for engaging and compressing the holder.

20. The kit of claim 17, wherein at least one of the holders includes an indent for receiving the arms of the clip.

21. The device of claim 20, wherein the indent comprises an annular ring.

22. The device of claim 17, wherein at least one of the plurality of the holders includes a cylindrical shape.

23. The device of claim 22, wherein the interior cavity of at least one of the plurality of holders is cylindrical.

24. The device of claim 17, wherein at least one of the interior cavities includes inflatable ridges for engaging objects inserted in the cavity.

25. The device of claim 24, wherein the inflatable ridges deform upon insertion of the object to form a firm hold.

26. The device of claim 24, wherein the inflatable ridges extend around the inner periphery of the interior cavity.

27. The device of claim 17, wherein the interior cavity of at least one of the bodies includes sidewalls that converge inwardly from the top of the at least one cavity to the bottom of the at least one cavity.

28. The device of claim 17, wherein at least one of the plurality of holders includes a first portion having a cylindrical holder and a second portion having a rectangular holder.

* * * * *